United States Patent
Tsai

(10) Patent No.: US 9,059,763 B2
(45) Date of Patent: Jun. 16, 2015

(54) RECEIVER CONTROL CIRCUIT AND PORTABLE ELECTRONIC DEVICE EMPLOYING SAME

(71) Applicant: Chiun Mai Communication Systems, Inc., New Taipei (TW)

(72) Inventor: Chia-Wei Tsai, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 10 days.

(21) Appl. No.: 14/040,488

(22) Filed: Sep. 27, 2013

(65) Prior Publication Data

US 2014/0308910 A1    Oct. 16, 2014

(30) Foreign Application Priority Data

Apr. 16, 2013  (TW) .................................. 102113397

(51) Int. Cl.
*H04B 7/08* (2006.01)
(52) U.S. Cl.
CPC ..................................... *H04B 7/082* (2013.10)
(58) Field of Classification Search
CPC ........ H04B 7/082; H04B 7/08; G06F 3/0421; F21Y 2101/02; F21Y 2113/005; H04R 1/028; H04L 7/033
USPC .......... 455/140, 132, 159.1, 500, 66.1, 550.1, 455/556.1
See application file for complete search history.

(56) References Cited

U.S. PATENT DOCUMENTS

| | | | |
|---|---|---|---|
| 8,548,541 B2 * | 10/2013 | Rayner ....................... | 455/575.8 |
| 8,868,134 B2 * | 10/2014 | Lai ................................. | 455/566 |
| 2014/0187220 A1 * | 7/2014 | Bond et al. ..................... | 455/418 |
| 2014/0231633 A1 * | 8/2014 | Parodi-Keravec et al. ... | 250/216 |
| 2014/0275871 A1 * | 9/2014 | Lamego et al. ............... | 600/316 |

* cited by examiner

*Primary Examiner* — Pablo Tran
(74) *Attorney, Agent, or Firm* — Novak Druce Connolly Bove + Quigg LLP

(57) ABSTRACT

A receiver control circuit includes a first receiver, a second receiver, a first light sensor, a second light sensor, and a determination circuit. The first light sensor detects light transmitted to the first receiver. The second light sensor detects light transmitted to the second receiver. The determination circuit compares an intensity of the light detected by the first light sensor with an intensity of the light detected by the second light sensor. The determination circuit further selectively activates the first receiver when the intensity of the light detected by the first light sensor is less than the intensity of the light detected by the second light sensor, or activates the second receiver when the intensity of the light detected by the first light sensor is greater than the intensity of the light detected by the second light sensor.

18 Claims, 3 Drawing Sheets

RECEIVER CONTROL CIRCUIT AND PORTABLE ELECTRONIC DEVICE EMPLOYING SAME

BACKGROUND

1. Technical Field

The exemplary disclosure generally relates to receiver control circuits, and particularly to a receiver control circuit for portable electronic device.

2. Description of Related Art

A mobile phone usually has one receiver which is located above a display of the mobile phone and at a middle portion of an upper end of the mobile phone. However, when large sized mobile phones are used, it is inconvenient for a user to align the receiver to an ear of the user to use the receiver.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the disclosure.

DETAILED DESCRIPTION

Figure 1:
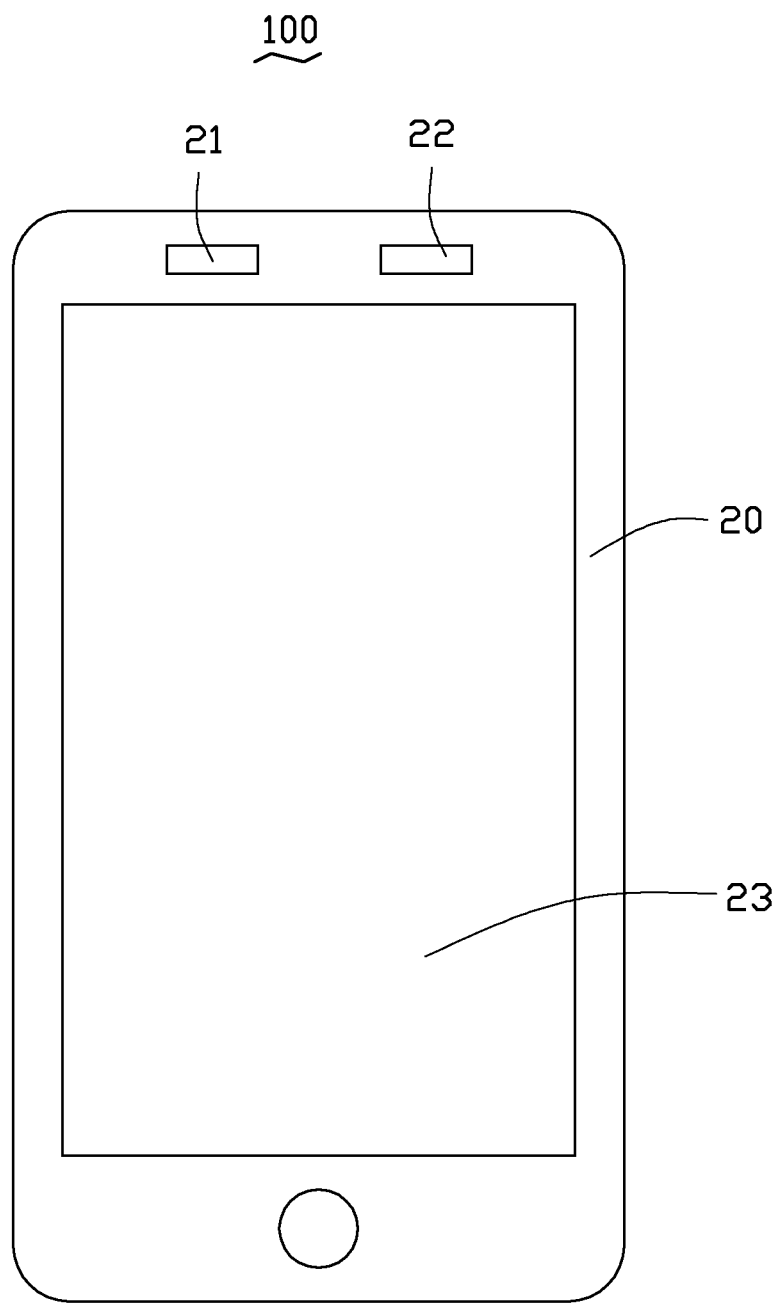
FIG. 1 is a schematic view of a portable electronic device, according to an exemplary embodiment.

FIG. 1 is a schematic view of a portable electronic device 100, according to an exemplary embodiment. The portable electronic device 100, such as a mobile phone, or a tablet computer, for example, includes a receiver control circuit 10 (shown in FIGS. 2 and 3), a housing 20 and a display 23 positioned on the housing 20. The housing 20 defines a first sound hole 21 and a second sound hole 22 spaced apart from the first sound hole 21. In the exemplary embodiment, the first and second sound holes 21,22 are located above the display 23. For example, when the display 23 faces a user, the first sound hole 21 is located in a upper left of the display 23, and the second sound hole 22 is located in a upper right of the display 23.

Figure 2:
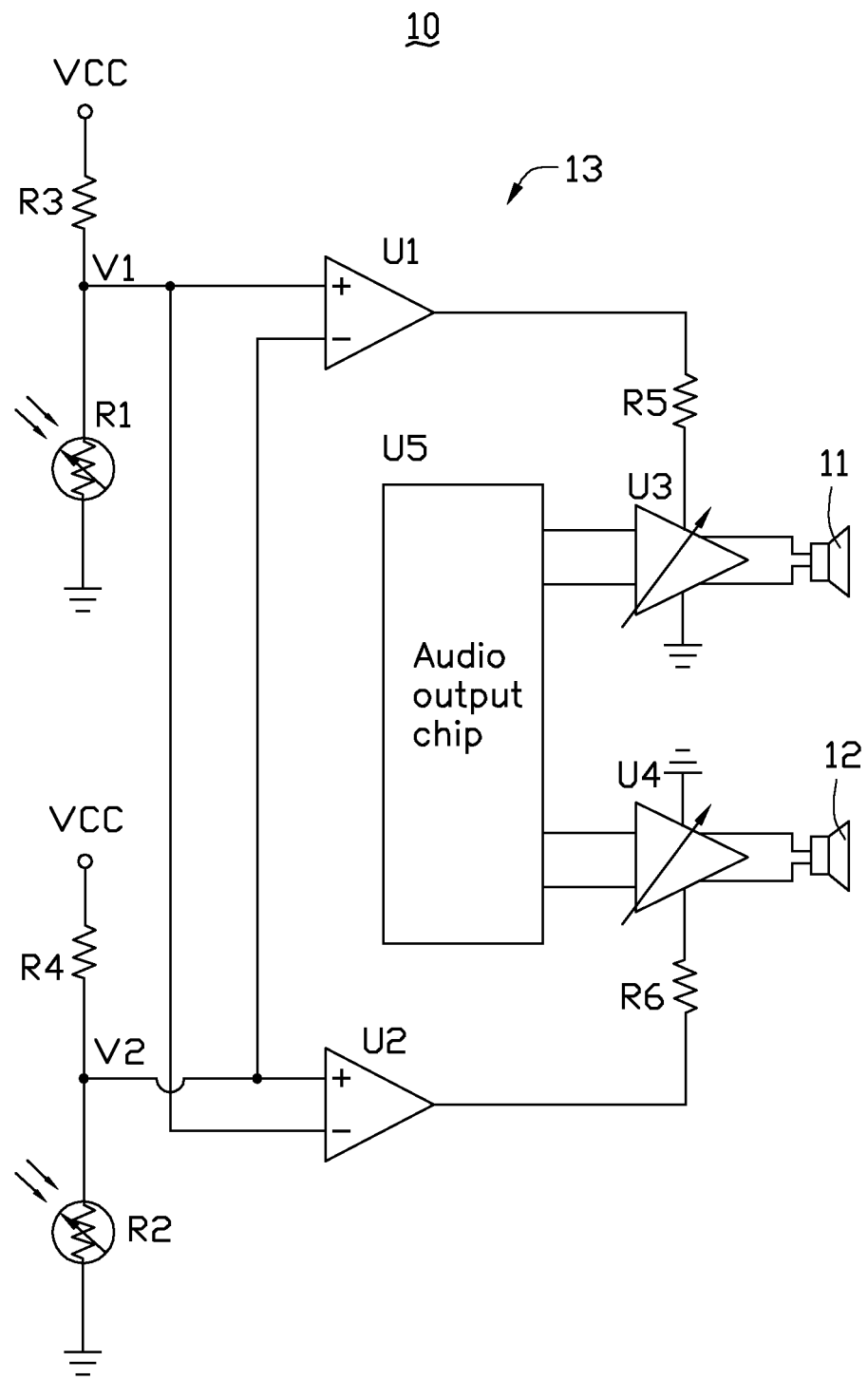
FIG. 2 is a circuit diagram of a first embodiment of a receiver control circuit of the portable electronic shown in FIG. 1.

FIG. 2 is a circuit diagram of a first embodiment of a receiver control circuit of the portable electronic shown in FIG. 1. In the first embodiment, the receiver control circuit 10 includes a first receiver 11, a second receiver 12, a first light sensor, a second light sensor, and a determination circuit 13. The first receiver 11 and the second receiver 12 are spacingly located on the housing 20. The first receiver 11 aligns with the first sound hole 21, and the second receiver 12 aligns with the second sound hole 22. In the exemplary embodiment, the first light sensor is a first photoresistor R1, the second light sensor is a second photoresistor R2. The first photoresistor R1 is positioned adjacent to the first receiver 11, and receives light via the first sound hole 21 and the first receiver 11, that is, the first photoresistor R1 detects light transmitted to the first receiver 11. The second photoresistor R2 is positioned adjacent to the second receiver 12, and receives light via the second sound hole 22 and the second receiver 12, that is, the second photoresistor R2 detects light transmitted to the second receiver 12.

The determination circuit 13 is electronically connected to the first receiver 11, the second receiver 12, the first photoresistor R1, and the second photoresistor R2. The determination circuit 13 compares the intensity of light detected by the first photoresistor R1 with the intensity of light detected by the second photoresistor R2. In addition, the determining circuit 13 enables the first receiver 11 to actuate when the intensity of light detected by the first photoresistor R1 is less than the intensity of light detected by the second photoresistor R2. On the other hand, the determining circuit 13 enables the second receiver 12 to actuate when the intensity of light detected by the first photoresistor R1 is greater than the intensity of light detected by the second photoresistor R2.

In the embodiment, the determination circuit 13 includes a first signal conversion circuit, a second signal conversion circuit, a first comparator U1, a second comparator U2, a first audio amplifier U3, a second audio amplifier U4, an audio output chip U5, and a power supply VCC. The first signal conversion circuit cooperates with the first photoresistor R1 in converting the light detected by the first photoresistor R1 to a first voltage signal V1. The second signal conversion circuit cooperates with the second photoresistor R2 in converting the light detected by the second photoresistor R2 to a second voltage signal V2. In the first embodiment, the first signal conversion circuit includes a first voltage dividing circuit R3. The second signal conversion circuit includes a second voltage dividing circuit R4.

One terminal of the first voltage dividing resistor R3 is electronically connected to the power supply VCC, the other terminal of the first voltage dividing resistor R3 is grounded via the first photoresistor R1. One terminal of the second voltage dividing resistor R4 is electronically connected to the power supply VCC, the other terminal of the second voltage dividing resistor R4 is grounded via the second photoresistor R2. A node between the first voltage dividing resistor R3 and the first photoresistor R1 is electronically connected to a non-inverting input terminal of the first comparator U1, and is electronically connected to an inverting input terminal of the second comparator U2. A node between the second voltage dividing resistor R4 and the second photoresistor R2 is electronically connected to an inverting input terminal of the first comparator U1, and is electronically connected to a non-inverting input terminal of the second comparator U2. An output terminal of the first comparator U1 is electronically connected to a power terminal of the first audio amplifier U3 via a first resistor R5. An output terminal of the second comparator U2 is electronically connected to a power terminal of the second audio amplifier U4 via a second resistor R6. An output terminal of the audio output chip U5 is electronically connected to the first receiver 11 via the first audio amplifier U3, and is electronically connected to the second receiver 12 via the second audio amplifier U4. The audio chip U5 outputs audio signals. The first and second audio amplifiers U3, U4 amplify the audio signal output from the audio chip U5 individually. The audio signals are selectively output to the first receiver 11 or the second receiver 12 by controlling operations of the first and second audio amplifiers U3 and U4.

In the first embodiment, the first photoresistor R1 has a characteristic that when intensity of light detected by the first photoresistor R1 is increased, a resistance of the first photoresistor R1 is decreased, and when intensity of light detected by the first photoresistor R1 is decreased, the resistance of the first photoresistor R1 is increased. Similarly, the second photoresistor R2 has a characteristic that when intensity of light detected by the second photoresistor R2 is increased, a resistance of the second photoresistor R2 is decreased, and when intensity of light detected by the second photoresistor R2 is decreased, the resistance of the second photoresistor R2 is increased. The first voltage dividing resistor R3 has the same resistance as the resistance of the second voltage dividing resistor R4.

In use, if the intensity of the light detected by the first photoresistor R1 is less than the intensity of the light detected by the second photoresistor R2. For example, when the portable electronic device 100 is held by a left hand of a user, at this time, the first receiver 11 tends to be shielded by a left ear of the user, and the second receiver 12 is not shielded, so that the intensity of the light detected by the first photoresistor resister R1 which is adjacent to the first receiver 11 is less than the intensity of the light detected by the second photoresistor R2. At this time, according to the characteristics of the first and second photoresistors R1 and R2, the resistance of the first photoresistor R1 is greater than the resistance of the second photoresistor R2. The first voltage signal V1 output to the non-inverting input terminal of the first comparator U1 is higher than the second voltage signal V2 output to the inverting input terminal of the first comparator U1. The first comparator U1 outputs a high level voltage (e.g. logic 1) to the power terminal of the first audio amplifier U3, such that the first audio amplifier U3 is activated to output amplified audio signals to the first receiver 11. Simultaneously, the first voltage signal V1 output to the inverting input terminal of the second comparator U2 is higher than the second voltage signal V2 output to the non-inverting input terminal of the second comparator U2. The second comparator U2 outputs a low level voltage (e.g. logic 0) to the power terminal of the second audio amplifier U5, such that the second audio amplifier U5 is deactivated.

In use, if the intensity of the light detected by the first photoresistor R1 is greater than the intensity of the light detected by the second photoresistor R2. For example, when the portable electronic device 100 is held by a right hand of a user, the second receiver 12 tends to be shielded by a right ear of the user, and the first receiver 11 is not shielded. The intensity of the light detected by the second photoresistor resister R2 which is adjacent to the second receiver 12 is less than the intensity of the light detected by the first photoresistor R1. At this time, according to the characteristics of the first and second photoresistors R1 and R2, the resistance of the second photoresistor R2 is greater than the resistance of the first photoresistor R1. The first voltage signal V1 output to the inverting input terminal of the second comparator U2 is lower than the second voltage signal V2 output to the non-inverting input terminal of the second comparator U2. The second comparator U2 outputs a high level voltage (e.g. logic 1) to the power terminal of the second audio amplifier U5, such that the second audio amplifier U5 is activated to output amplified audio signals to the second receiver 12. Simultaneously, the first voltage signal V1 output to the non-inverting input terminal of the first comparator U1 is higher than the second voltage signal V2 output to the inverting input terminal of the first comparator U1. The first comparator U1 outputs a low level voltage (e.g. logic 0) to the power terminal of the first audio amplifier U3, such that the first audio amplifier U3 is deactivated.

Figure 3:
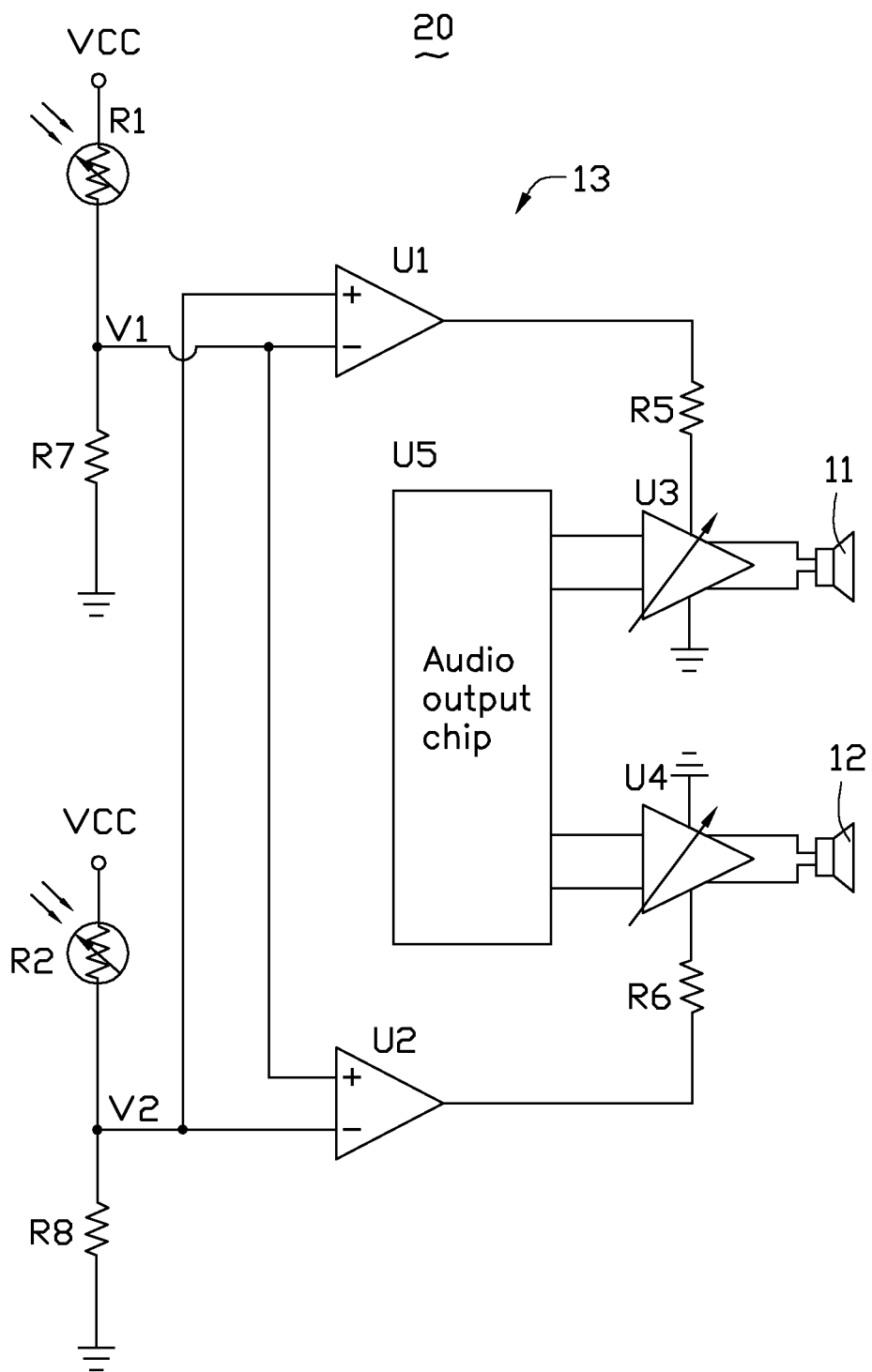
FIG. 3 is a circuit diagram of a second embodiment of the receiver control circuit of the portable electronic shown in FIG. 1.

FIG. 3 is a circuit diagram of a second embodiment of the receiver control circuit of the portable electronic shown in FIG. 1. In the second embodiment, the receiver control circuit 30 has almost the same components and working principle as the components and working principle of the receiver control circuit 10, and only differs from the receiver control circuit 10 in the following ways. The first signal conversion circuit of the receiver control circuit 30 includes a first voltage dividing resistor R7, the second signal conversion circuit of the receiver control circuit 30 includes a second voltage resistor R8. One terminal of the first voltage dividing resistor R7 is electronically connected to the power supply VCC via the first photoresistor R1, the other terminal of the second voltage dividing resistor R7 is grounded, a node between the first voltage dividing resistor R7 and the first photoresistor R1 is electronically connected to the inverting input terminal of the first amplifier U1 and the non-inverting input terminal of the second amplifier U2. One terminal of the second voltage dividing resistor R8 is electronically connected to the power supply VCC via the second photoresistor R2, and the other terminal of the second voltage dividing resistor R8 is grounded. A node between the second voltage dividing resistor R8 and the second photoresistor R2 is electronically connected to the non-inverting input terminal of the first amplifier U1 and the inverting input terminal of the second amplifier U2. In the exemplary embodiment, the first voltage dividing resistor R7 has the same resistance as the resistance of the second voltage dividing resistor R8.

In use, if the intensity of light detected by the first photoresistor R1 is less than the intensity of light detected by the second photoresistor R2, the resistance of the first photoresistor R1 is greater than the second photoresistor R2. The first voltage signal V1 output from the node between the first photoresistor R1 and the first voltage dividing resistor R7 is lower than the second voltage signal V2 output from the node between the second photoresistor R2 and the second voltage dividing resistor R8. As such the first amplifier U1 outputs a high level voltage to enable the first audio amplifier U3 and the first receiver 11, and the second amplifier U2 output a low level voltage to deactivate the second audio amplifier U4 and the second receiver 12.

If the intensity of light detected by the first photoresistor R1 is greater than the intensity of light detected by the second photoresistor R2, the resistance of the first photoresistor R1 is less than the second photoresistor R2. The first voltage signal V1 output from the node between the first photoresistor R1 and the first voltage dividing resistor R7 is higher than the second voltage signal V2 output from the node between the second photoresistor R2 and the second voltage dividing resistor R8. As such the first amplifier U1 outputs a low level voltage to deactivate the first audio amplifier U3 and the first receiver 11, and the second amplifier U2 output a high level voltage to enable the second audio amplifier U4 and the second receiver 12.

The portable electronic device 100 employs two receivers, which can be conveniently aligned with the ear no matter how the portable electronic device 100 is held. In addition, the determination circuit 13 selectively enables the first and second receivers 11 and 12 according to the intensities of the light detected by the first and the second light sensors, such that the receiver shielded by the ear of the user can be accurately activated.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A receiver control circuit for a portable electronic device, comprising:
a first receiver positioned on the portable electronic device;

a second receiver positioned on the portable electronic device and spaced apart from the first receiver;

a first light sensor positioned adjacent to the first receiver, the first light sensor detecting light transmitted to the first receiver;

a second light sensor positioned adjacent to the second receiver, the second light sensor detecting light transmitted to the second receiver; and a determination circuit electronically connected to the first receiver, the second receiver, the first light sensor, and the second light sensor; the determination circuit comparing an intensity of the light detected by the first light sensor with an intensity of the light detected by the second light sensor, the determination circuit further selectively activating the first receiver when the intensity of the light detected by the first light sensor is less than the intensity of the light detected by the second light sensor, or activating the second receiver when the intensity of the light detected by the first light sensor is greater than the intensity of the light detected by the second light sensor.

2. The receiver control circuit of claim 1, wherein the determination circuit deactivates the second receiver when the first receiver is actuated, or deactivates the first light sensor receiver when the second receiver is actuated.

3. The receiver control circuit of claim 1, wherein the first light sensor is a first photoresistor, the second light sensor is a second photoresistor.

4. The receiver control circuit of claim 3, wherein the determination circuit comprise a first signal conversion circuit, a second signal conversion circuit, a first comparator, a first audio amplifier, and an audio output chip; an output terminal of the audio output chip is electronically connected to the first receiver via the first audio amplifier; the audio output chip output audio signals, the first audio amplifier amplifies the audio signals and output the amplified audio signals to the first receiver; an output terminal of the first comparator is electronically connected to a power terminal of the audio amplifier; the first signal conversion circuit converts the light detected by the first photoresistor to a first voltage signal that is output to one of two input terminals of the first comparator, the second signal conversion circuit converts the light detected by the second photoresistor to a second voltage signal that is output to the other one of the two input terminals of the first comparator.

5. The receiver control circuit of claim 4, wherein the determination circuit further comprises a second comparator and a second audio amplifier, one of two input terminals of the second comparator is electronically connected to the output of the first signal conversion circuit to receive the first voltage signal, the other one of the two input terminals of the second comparator is electronically connected to output of the second signal conversion circuit to receive the second voltage signal, an output terminal of the second comparator is electronically connected to a power terminal of the second audio amplifier; the output terminal of the audio output chip is electronically connected to the second receiver via the second audio amplifier, the second audio amplifier amplifies the audio signals output from the audio output chip, and output the amplified audio signals to the second receiver.

6. The receiver control circuit of claim 5, wherein the determination circuit further comprises a power supply, the first signal conversion circuit comprises a first voltage dividing resistor, one terminal of the first voltage dividing resistor is electronically connected to the power supply, the other terminal of the first voltage dividing resistor is grounded via the first photoresistor, a node between the first voltage dividing resistor and the first photoresistor is electronically connected to a non-inverting input terminal of the first comparator and an inverting terminal of the second comparator; the second signal conversion circuit comprises a second voltage dividing resistor, one terminal of the second voltage dividing resistor is electronically connected to the power supply, the other terminal of the second voltage dividing resistor is grounded via the second photoresistor, a node between the second voltage dividing resistor and the second photoresistor is electronically connected to an inverting input terminal of the first comparator and a non-inverting input terminal of the second comparator.

7. The receiver control circuit of claim 5, wherein the determination circuit further comprises a power supply, the first signal conversion circuit comprises a first voltage dividing resistor, one terminal of the first voltage dividing resistor is electronically connected to the power supply via the first photoresistor, the other terminal of the first voltage dividing resistor is grounded, a node between the first voltage dividing resistor and the first photoresistor is electronically connected to a inverting input terminal of the first comparator and a non-inverting terminal of the second comparator; the second signal conversion circuit comprises a second voltage dividing resistor, a first terminal of the second voltage dividing resistor is electronically connected to the power supply via the second photoresistor, a second terminal of the second voltage dividing resistor is grounded, a node between the second voltage dividing resistor and the second photoresistor is electronically connected to a non-inverting input terminal of the first comparator and an inverting input terminal of the second comparator.

8. The receiver control circuit of claim 6, wherein the first voltage dividing resistor and the second resistor comprises the same resistance.

9. The receiver control circuit of claim 7, wherein the first voltage dividing resistor and the second resistor comprises the same resistance.

10. A portable electronic device, comprising:
a housing defining a first sound hole and a second sound spaced apart from the first sound hole; and
a receiver control circuit, comprising:
a first receiver positioned on the housing and aligning with the first sound hole;
a second receiver positioned on the housing and aligning with the second sound hole;
a first light sensor positioned adjacent to the first receiver, the first light sensor detecting light transmitted to the first receiver;
a second light sensor positioned adjacent to the second receiver, the second light sensor detecting light transmitted to the second receiver; and
a determination circuit electronically connected to the first receiver, the second receiver, the first light sensor, and the second light sensor; the determination circuit comparing an intensity of the light detected by the first light sensor with an intensity of the light detected by the second light sensor, the determination circuit further selectively activating the first receiver when the intensity of the light detected by the first light sensor is less than the intensity of the light detected by the second light sensor, or activating the second receiver when the intensity of the light detected by the first light sensor is greater than the intensity of the light detected by the second light sensor.

11. The portable electronic device of claim 10, wherein the determination circuit deactivates the second receiver when the first receiver is activated, or deactivates the first light sensor receiver when the second receiver is activated.

12. The portable electronic device of claim 10, wherein the first light sensor is a first photoresistor, the second light sensor is a second photoresistor.

13. The portable electronic device of claim 12, wherein the determination circuit comprise a first signal conversion circuit, a second signal conversion circuit, a first comparator, a first audio amplifier, and an audio output chip; an output terminal of the audio output chip is electronically connected to the first receiver via the first audio amplifier; the audio output chip output audio signals, the first audio amplifier amplifies the audio signals and output the amplified audio signals to the first receiver; an output terminal of the first comparator is electronically connected to a power terminal of the audio amplifier; the first signal conversion circuit converts the light detected by the first photoresistor to a first voltage signal that is output to one of two input terminals of the first comparator, the second signal conversion circuit converts the light detected by the second photoresistor to a second voltage signal that is output to the other one of the two input terminals of the first comparator.

14. The portable electronic device of claim 13, wherein the determination circuit further comprises a second comparator and a second audio amplifier, one of two input terminals of the second comparator is electronically connected to the output of the first signal conversion circuit to receive the first voltage signal, the other one of the two input terminals of the second comparator is electronically connected to output of the second signal conversion circuit to receive the second voltage signal, an output terminal of the second comparator is electronically connected to a power terminal of the second audio amplifier; the output terminal of the audio output chip is electronically connected to the second receiver via the second audio amplifier, the second audio amplifier amplifies the audio signals output from the audio output chip, and output the amplified audio signals to the second receiver.

15. The portable electronic device of claim 14, wherein the determination circuit further comprises a power supply, the first signal conversion circuit comprises a first voltage dividing resistor, a first terminal of the first voltage dividing resistor is electronically connected to the power supply, a second terminal of the first voltage dividing resistor is grounded via the first photoresistor, a node between the first voltage dividing resistor and the first photoresistor is electronically connected to a non-inverting input terminal of the first comparator and an inverting terminal of the second comparator; the second signal conversion circuit comprises a second voltage dividing resistor, one terminal of the second voltage dividing resistor is electronically connected to the power supply, the other terminal of the second voltage dividing resistor is grounded via the second photoresistor, a node between the second voltage dividing resistor and the second photoresistor is electronically connected to an inverting input terminal of the first comparator and a non-inverting input terminal of the second comparator.

16. The portable electronic device of claim 14, wherein the determination circuit further comprises a power supply, the first signal conversion circuit comprises a first voltage dividing resistor, one terminal of the first voltage dividing resistor is electronically connected to the power supply via the first photoresistor, the other terminal of the first voltage dividing resistor is grounded, a node between the first voltage dividing resistor and the first photoresistor is electronically connected to a inverting input terminal of the first comparator and a non-inverting terminal of the second comparator; the second signal conversion circuit comprises a second voltage dividing resistor, one terminal of the second voltage dividing resistor is electronically connected to the power supply via the second photoresistor, the other terminal of the second voltage dividing resistor is grounded, a node between the second voltage dividing resistor and the second photoresistor is electronically connected to a non-inverting input terminal of the first comparator and an inverting input terminal of the second comparator.

17. The portable electronic device of claim 15, wherein the first voltage dividing resistor and the second resistor comprises the same resistance.

18. The portable electronic device of claim 16, wherein the first voltage dividing resistor and the second resistor comprises the same resistance.

* * * * *